C. A. BEVER.
STOVEPIPE.
APPLICATION FILED JUNE 13, 1916.
1,315,904.
Patented Sept. 9, 1919.
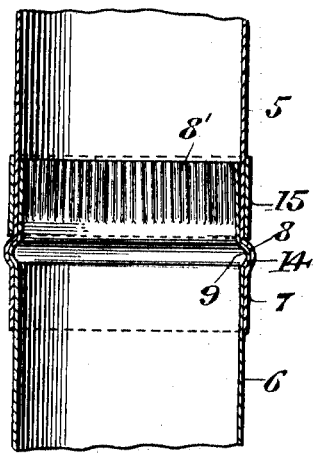
Fig. 3.
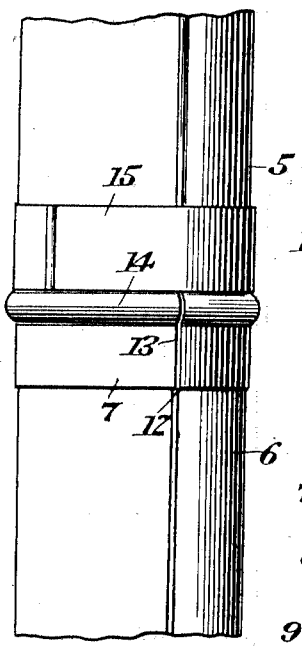
Fig. 1.
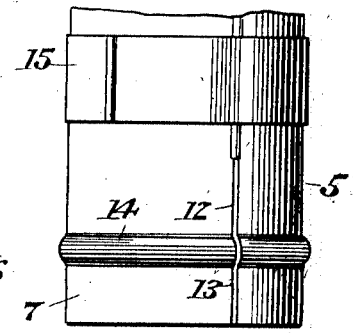
Fig. 2.
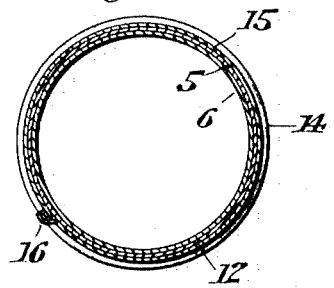
Fig. 4.
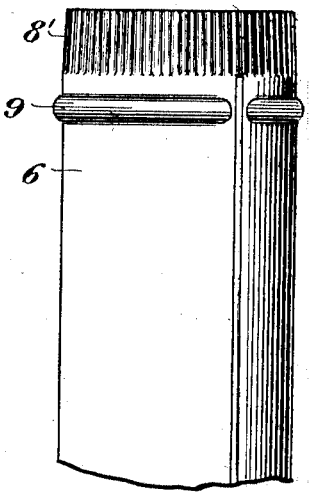
Inventor
Charles A. Bever
Witnesses
By Victor J. Evans
Attorney

UNITED STATES PATENT OFFICE.

CHARLES A. BEVER, OF KOPIAH, WASHINGTON.

STOVEPIPE.

1,315,904. Specification of Letters Patent. Patented Sept. 9, 1919.

Application filed June 13, 1916. Serial No. 103,522.

*To all whom it may concern:*

Be it known that I, CHARLES A. BEVER, a citizen of the United States, residing at Kopiah, in the county of Lewis and State of Washington, have invented new and useful Improvements in Stovepipes, of which the following is a specification.

This invention relates to new and useful improvements in sheet metal pipes so designed or constructed whereby the meeting joints of the sections of the pipe may be easily assembled in overlapping relation and secured or locked together for preventing any accidental displacement of said sections.

The primary object of the invention is the provision of a device of the above stated character, wherein the receiving end of one pipe section is slitted in order to permit of the expansion thereof upon the insertion of the end of the adjacent pipe section, thereby enabling the lengths or sections of the pipe being more expeditiously coupled together.

With the above and other objects in view, the invention consists in the novel features, details of construction and combination of parts which will hereinafter be more fully set forth, illustrated in the accompanying drawing and pointed out in the appended claim.

Figure 1 is a perspective view of two lengths of sheet metal pipe united by a joint embodying my invention;

Fig. 2 is a view similar to Fig. 1 showing the two pipe lengths disconnected;

Fig. 3 is a detail longitudinal sectional view taken through Fig. 1; and

Fig. 4 is a transverse section.

Referring more particularly to the accompanying drawing, in which like characters of reference refer to corresponding parts in the several views, 5 and 6 denote two lengths or sections of the pipe to be united or coupled together by the joint which is formed by the coöperating ends of said lengths or sections. The receiving end 7 of the pipe length 5 is so constructed to permit of the expansion or contraction thereof when the meeting end of the section 6 is jointed or locked therein. To this end, the meeting end 7 of the pipe length 5 is formed with an annular groove 8 adapted to receive the annular beading 9 formed on the pipe section 6, when the insertible end 8' of the pipe section 6 is located within the receiving end 7 of the pipe section 5. The end portion 7 of the pipe section 5 is provided at a point adjacent its end with an annular groove 8. It might at this time be stated, by forming the jointed or receiving end 7 of the pipe section 5 with the longitudinal slot 12, it permits of the expansion of the pipe at the extremity of its receivable end, thereby enabling the beading 9 to engage in the groove 8 of the section 5, and establish a firm interlocking engagement of the meeting ends of the pipe sections, as is clearly apparent from the drawing. The slit 12 also receives the seam of the section 6 when assembled, thus allowing the section to have a close, leak proof contact. By the forming of the receiving end 7 of the section 5 with an annular groove 8, it provides the said pipe section with a beading 14. A band 15 is provided and is adapted to embrace or encircle the pipe sections at the meeting ends thereof, and by providing the beading 14, causes a tight connection at the joint of the edges of the sections. The sections constituting the joint are interlocked together by forming the transverse extremities thereof with hooked portions 16. It will, of course, be understood to those skilled in the art that this band may be easily and readily disconnected from the pipe sections, by merely detaching the hooked ends thereof.

From the foregoing description, taken in connection with the accompanying drawing, the advantages of construction and of the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the claim.

I claim:

A pipe joint comprising a section provided with a bead which is closed at its ends and which is spaced from the end of the section, a second section provided at its end portion with a longitudinally disposed slit whereby the said end portion of the section may expand diametrically, the portions of the section at the opposite edges of the slit being spaced from each other to receive the seam of the first mentioned section when assembled, the second mentioned section being further provided at a point between the ends of the slit with a circumferential groove which is open at its ends and adapted to receive said bead and a band slidably mounted on the second mentioned section and which may engage the grooved portion thereof.

In testimony whereof I affix my signature in presence of two witnesses.

CHARLES A. BEVER.

Witnesses:
N. A. MILLER,
S. W. SAGAR.

Copies of this patent may be obtained for five cents each, by addressing the "Commissioner of Patents, Washington, D. C."